US006306536B1

(12) United States Patent
Wilkinson et al.

(10) Patent No.: US 6,306,536 B1
(45) Date of Patent: Oct. 23, 2001

(54) METHOD OF REDUCING FUEL CELL PERFORMANCE DEGRADATION OF AN ELECTRODE COMPRISING POROUS COMPONENTS

(75) Inventors: David P. Wilkinson, North Vancouver; Jean St.-Pierre, Vancouver; Joy A. Roberts, Coquitlam; Stephen A. Campbell, Maple Ridge, all of (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/280,147

(22) Filed: Mar. 26, 1999

Related U.S. Application Data
(60) Provisional application No. 60/079,747, filed on Mar. 27, 1998.

(51) Int. Cl.[7] .............. H01M 8/10; H01M 4/86; H01M 4/88; C25C 7/04; C25B 11/03
(52) U.S. Cl. ............. 429/33; 429/42; 429/40; 429/44; 502/101; 204/282; 204/283
(58) Field of Search .............. 502/101; 429/33, 429/42, 40, 44; 204/282, 283

(56) References Cited

U.S. PATENT DOCUMENTS

| | | | |
|---|---|---|---|
| 4,287,232 | * 9/1981 | Goller et al. | 429/42 |
| 4,500,395 | 2/1985 | Nakamura | 204/284 |
| 4,810,594 | * 3/1989 | Bregoli et al. | 502/101 |
| 5,185,218 | 2/1993 | Brokman et al. | 429/27 |
| 5,186,877 | 2/1993 | Watanabe | 264/104 |
| 5,346,780 | 9/1994 | Suzuki | 429/42 |
| 5,861,222 | * 1/1999 | Fischer et al. | 429/42 |

FOREIGN PATENT DOCUMENTS

| | | |
|---|---|---|
| 0 305 565 | 3/1989 | (EP) . |
| 61-158669 | * 7/1986 | (JP) . |

OTHER PUBLICATIONS

Watanabe, et al., "Experimental Analysis of the Reaction Layer Structure in a Gas Diffusion Electrode," *Journal of Electroanalytical Chemistry*, 195:81–93 (1985).

Watanabe, et al., "New Preparation Method of a High Performance Gas Diffusion Electrode Working at 100% Utilization of Catalyst Clusters and Analysis of the Reaction Layer," *Journal of Electroanalytical Chemistry*, 197:195–208 (1986).

Uchida, et al., Investigation of the Microstructure in the Catalyst Layer and Effects of Both Perfluorosulfonate Ionomer and PTFE–Loaded Carbon on the Catalyst Layer of Polymer Electrolyte Fuel Cells, *J.Electrochem. Soc.*, 142(12):4143–4149 (Dec., 1995).

(List continued on next page.)

*Primary Examiner*—Mark F. Huff
*Assistant Examiner*—Daborah Chacko-Davis
(74) *Attorney, Agent, or Firm*—McAndrews, Held & Malloy, Ltd.

(57) ABSTRACT

An improved method reduces fuel cell performance degradation of an electrode comprising porous components. Electrochemical solid polymer electrolyte fuel cells typically have present therein a liquid which expands upon freezing, such as, for example water. The presence of such a liquid within the pores of the electrode components may cause performance degradation of the liquid freezes. The present method comprises employing an impregnant within at least some of the pores of the electrode components. The impregnant inhibits the deterioration of porous fuel cell components caused by expansion of the liquid within the pores when the fuel cell components are subjected to a temperature below the freezing temperature of the liquid. Preferably the impregnant does not expand when changing phases from a liquid to a solid. The impregnant may comprise an organic fluid, an organic acid, an inorganic acid, a polymer or dispersion.

48 Claims, 2 Drawing Sheets

OTHER PUBLICATIONS

Wilson, et al., "Low Platinum Loading Electrodes for Polymer Electrolyte Fuel Cells Fabricated Using Thermoplastic Ionomers," *Electrochimica Acta 40(3)*:355–363 (1995).

Uchida, et al., "Effects of Microstructure of Carbon Support in the Catalyst Layer on the Performance of Polymer–Electrolyte Fuel Cells," *Journal of Electrochemical Society, 143(7)*:2245–2252 (Jul., 1996).

Fournier, et al., "High–Performance, Low Pt Content Catalysts for the Electroreduction of Oxygen in Polymer–Electrolyte Fuel Cells," *J. Electrochem. Soc., 144(1)*:145–154 (Jan., 1997).

Malhotra, et al., "Membrane–Supported Nonvolatile Acidic Electrolytes Allow Higher Temperature Operation of Proton–Exchange Membrane Fuel Cells," *J. Electrochem. Soc., 144(2)*:L23–26 (Feb., 1997).

\* cited by examiner

METHOD OF REDUCING FUEL CELL PERFORMANCE DEGRADATION OF AN ELECTRODE COMPRISING POROUS COMPONENTS

CROSS-REFERENCE TO RELATED APPLICATION

This application relates to and claims priority benefits from U.S. Provisional Patent Application Ser. No. 60/079,747 filed Mar. 27, 1998, which is incorporated herein by reference in its entirety.

FIELD OF THE INVENTION

The present invention relates to electrochemical cell electrodes and a method of reducing fuel cell performance degradation of an electrode comprising porous components. More particularly, the invention provides a method for impregnating porous electrodes with an impregnant which reduces the potential for freeze-expansion damage causing electrode deterioration.

BACKGROUND OF THE INVENTION

Electrochemical fuel cells convert reactants, namely fuel and oxidant fluid streams, to generate electric power and reaction products. Electrochemical fuel cells generally employ an electrolyte disposed between two electrodes, namely a cathode and an anode. The electrodes each comprise electrode components, including an electrocatalyst disposed at the interface between the electrolyte and the electrodes to induce the desired electrochemical reaction.

The electrocatalyst may be a metal black, an alloy, or a supported metal catalyst. The support for the electrocatalyst particles may be carbon particles. Preferably the carbon particles are in the form of a furnace black, although other particle forms may be used, such as an agglomerate, for example, an acetylene black. The electrode may also comprise other electrode components such as an electrically conductive substrate upon which the electrocatalyst layer is deposited. A typical substrate comprises a porous sheet material, such as carbon fiber paper or cloth. The electrode components may further comprise other electrically conductive particles such as fillers and binders. Some, or all, of the electrode components may be microporous.

For greater clarity, the term microporous is used in this disclosure to describe materials which have pores or crevices with an aperture size less than 1 micron. In this specification, an aperture is defined as the gap distance at any depth between opposing walls within pores. Accordingly, the term micropore is used to describe portions of pores or crevices with aperture sizes less than or equal to 1 micron.

A solid polymer fuel cell is a type of electrochemical fuel cell which employs a membrane electrode assembly ("MEA"). The MEA integrates a solid polymer electrolyte or ion-exchange membrane between the anode and the cathode. With such membranes, the water content within the membrane affects the performance of the fuel cell. The ion conductivity of the membrane generally increases as the water content or hydration of the membrane increases. For this reason, it is desirable for water to be present within solid polymer fuel cells. In some fuel cells, one or both of the reactant streams are humidified to prevent dehydration of the membrane.

Water is also produced within the fuel cell as the product of the cathode reaction. Oxygen is typically supplied to the cathode as pure oxygen or as a dilute oxygen stream such as air. Protons produced at the anode migrate through the ion conductive membrane and combine with oxygen at the cathode to produce water. Electrons are conducted from the anode to the cathode through an external circuit.

With direct methanol fuel cells, the fuel stream is typically aqueous methanol, with the larger portion of the fuel stream being water.

Since the anode and cathode are both adjacent to the hydrated membrane, the electrodes are consistently in contact with a water source. At the anode, humidified gaseous fuel streams or aqueous fuel streams are additional sources of water. At the cathode, reaction product water is an additional source of water. Accordingly, water typically collects or condenses within the pores of untreated porous electrode components.

The presence of water within the pores of electrode components is potentially harmful. However, if the temperature within the fuel cell falls below the freezing temperature of water for a sufficient time, the water may freeze. Since water expands when it freezes, when water freezes within the pores of fuel cell components the freeze-expansion may cause structural damage to porous fuel cell components. Such structural damage may result in deterioration of the electrode causing fuel cell performance degradation. If the water freeze-thaw cycle is repeated, the potential for freeze-expansion damage to porous fuel cell components increases. Porous electrode components are particularly at risk because water typically condenses within the pores.

It is known to apply surface coatings to porous electrodes for various reasons, such as for example, increasing the electrochemically active surface area of the electrocatalyst by applying an ionically conductive material to the electrode. A surprising result is that some of these coating materials when impregnated into the pores of the electrode components can improve the tolerance of porous electrodes to water freeze-thaw cycles. Such coating materials reduce the open pore volume which means that less water can collect within the pores. Coating materials deposited within the pores may also reduce the pore aperture size, making it more difficult for water to enter the pores. Some coatings may also be hydrophobic, such that the coatings actually repel water. Other coatings may have the effect of reducing the freezing temperature of water.

However, conventional methods of applying coatings do not coat all of the interior pore surfaces. Conventional methods may deposit a coating on the interior surfaces of some of the macropores which have aperture sizes larger than 1 micron. Conventional methods also impregnate some of the micropores. However, it has been found that the micropores typically comprise two distinct size ranges, generally referred to as primary micropores and secondary micropores. Primary micropores are smaller than secondary micropores. The primary micropores are not significantly impregnated by conventional methods, whereas conventional coating methods may impregnate a significant portion of the secondary micropores. The boundary aperture size between the primary and secondary micropores may depend upon the type of particles. For example, for carbon black particles, the boundary between primary and secondary micropores for furnace blacks is an aperture size of about 0.1 micron, whereas the boundary between primary and secondary micropores for acetylene blacks is an aperture size of about 0.04 microns. Conventional methods of coating electrodes are unable to significantly impregnate primary micropores.

Because the electrochemical reactions within an operating fuel cell are exothermic, with proper insulation, a conventional fuel cell may operate without experiencing internal freeze-thaw cycles in environments where the exterior of the fuel cell housing is exposed to temperatures significantly less than the freezing temperature of water. However, there is a problem for conventional fuel cells which may be shut down and stored in cold environments, such as fuel cells installed in vehicles or stationary power generators. For example, bus fleets do not typically have indoor garage facilities to accommodate all of the buses in a fleet; thus some buses may be parked in a yard where they are exposed to cold environments, including temperatures below the freezing temperature of water. Accordingly, there is a need to provide fuel cell electrodes with reduced performance degradation after exposure to temperatures below the freezing temperature of water.

SUMMARY OF THE INVENTION

The invention provides a method of reducing fuel cell performance degradation of an electrode comprising porous components. The method improves freeze-thaw cycle tolerance within all types of electrochemical fuel cells which have present therein a liquid such as water or other aqueous solutions which may expand upon freezing. Accordingly, the method is applicable to solid polymer fuel cells which produce water at the cathode and/or which employ a hydrated ion exchange membrane as the electrolyte.

The method comprises employing an impregnant within at least some of the pores of porous electrode components which are incorporated in a fuel cell electrode. The impregnant remains within the interior volume of the porous electrode component pores reducing the amount of interior volume which may be occupied by liquids such as water or aqueous solutions which expand upon freezing. Unlike a coating, the impregnant may remain in the micropores in a liquid or solid form. The impregnant reduces structural damage caused by freeze expansion of liquids within the pores when the electrode is subjected to a temperature below the freezing temperature of the liquid.

The method is particularly useful for fuel cells which have electrodes comprising microporous components such as, for example, carbon-supported electrocatalyst particles. Where the carbon support is a furnace black, the impregnated pores preferably comprise micropores with apertures less than 0.1 micron. For acetylene black carbon supports, the impregnated pores preferably comprise micropores with apertures less than 0.04 micron.

Preferably liquid impregnants have a pour point or freezing temperature lower than the freezing temperature of the liquid (e.g. water). More preferably, the impregnant has a pour point or freezing temperature less than or equal to $-25°$ C., or even more preferably, less than or equal to $-40°$ C. In addition, or in the alternative, the impregnant may have the property of not increasing in volume when changing phases from a liquid to a solid. That is, the impregnant may solidify at a temperature above the freezing temperature of the liquid so long as the impregnant does not increase in volume which it changes phases from the liquid phase to the solid phase. Preferably, the impregnant exhibits ionic conductivity and reactant permeability in both the liquid and solid phases.

For impregnants which remain in the liquid phase, it is preferred that the impregnant be immiscible with water. Otherwise, water may dilute the impregnant and/or leach the impregnant from the pores.

The impregnant may be a mixture of materials. For example, the impregnant may comprise a hydrophobic material, such as, for example, polytetrafluoroethylene ("PTFE"). PTFE particle sizes as small as 0.05 micron may be suspended in water with a surfactant to impregnate the micropores. The impregnant may comprise solids in suspension or a solution which at least partially evaporates leaving solid deposits. That is, the impregnant may be a material which is deposited within the pores as a liquid or as a solid suspended in a liquid, but which remains within the pores as a solid. As a further example, the impregnant may be a resin which is curable to solidify within the pores.

The impregnant may also comprise an inorganic acid, an organic acid, or a polymer. Where the impregnant comprises an inorganic acid, the inorganic acid may be selected from the group consisting of $H_3PO_4$ and $HNO_3$. Where the impregnant comprises an organic acid, the organic acid may be a fluorinated organic acid selected from the group consisting of $CF_3COOH$ and $CF_3SO_3H$.

The impregnant may also comprise an organic fluid, for example, one selected from the group consisting of hydrocarbons, fluorocarbons, and non-halogenated oils. The organic fluid is preferably a liquid. An example of a suitable hydrocarbon is 1-decene. The organic fluid may be a perfluorocarbon selected from the group consisting of perfluorotripropylamine, cis-perfluorodecalin, trans-perfluorodecalin, perfluoro-1-methyl decalin, perfluoroisopentyltetrahydropyrane, perfluoro-N,N-dimethylcyclohexylamine, perfluoroperhydrophenanthrene, perfluorotripentylamine, and perfluorotributylamine. Other organic fluids such as silicone oil or a mineral oil may be included as part of the impregnant mixture.

The method further comprises incorporating porous electrode components in an electrochemical fuel cell electrode, wherein the porous electrode components have been subjected to a vacuum to impregnate pores in the electrode components with an impregnant. The impregnation method comprises contacting the electrode, or the electrode components, with an impregnant at a pressure below atmospheric pressure. Preferably a vacuum is applied to the electrode or the porous electrode components to facilitate the impregnation.

In the alternative, or as an additional step to subjecting the electrode or porous electrode components to a pressure below atmospheric pressure, the impregnation method may comprise the step of contacting the electrodes, or the electrode components, with the impregnant at a pressure above atmospheric pressure.

The invention further provides an electrochemical fuel cell comprising porous components with reduced performance degradation after exposure to water freeze-thaw cycles. The fuel cell comprises:

(a) an anode comprising porous anode components;

(b) a cathode comprising porous cathode components; and (c) an electrolyte disposed between the anode and the cathode, wherein at least a portion of the porous anode and cathode components is impregnated with an impregnant which reduces the potential for freeze-expansion damage caused by exposure to water freeze-thaw cycles. Preferably the impregnant has a pour point or freezing temperature less than the freezing temperature of water. It is also preferable for the impregnant to not expand when changing phase from a liquid to a solid.

The anode and cathode impregnants may be the same or different. For example, the impregnant used for the cathode may be selected to improve the oxygen mass transport properties within the cathode pores, whereas, it may be more important for the anode impregnant to be more ion conductive.

An advantage of depositing an impregnant within the micropores which does not expand upon changing from a liquid to a solid is that it will not cause freeze-expansion damage. Furthermore, the impregnant occupies space which might otherwise be occupied by water. An impregnant which coats or adheres to the surface of such micropores reduces the aperture size, which may reduce the potential for water entering the impregnated micropores.

If the impregnant is hydrophobic, the impregnant may also actively repel water from entering the treated pores. Hydrophobicity also has the benefit of helping to keep the pores from being occluded by water, so that the pores remain open to accommodate the passage of gaseous reactants.

It is also possible to select impregnants which are miscible with water and which reduce the freezing temperature of water. However, a disadvantage of this approach is that impregnants which are miscible in water may become diluted, and over time, the impregnant may leach out of the micropores. Accordingly, it is preferable for the impregnant to be immiscible with water.

Further advantages may be achieved by selecting impregnants which have other desirable properties. For example, selected impregnants may also improve the mass transport properties of reactants and/or reaction products within the electrocatalyst pores. Accordingly, the method is particularly useful for treating pores within electrocatalyst particles which would not normally be significantly impregnated by conventional methods.

BRIEF DESCRIPTION OF THE DRAWINGS

The advantages, nature and additional features of the invention will become more apparent from the following description, together with the accompanying drawings, in which.

DETAILED DESCRIPTION OF THE PREFERRED EMBODIMENTS

Figure 1:
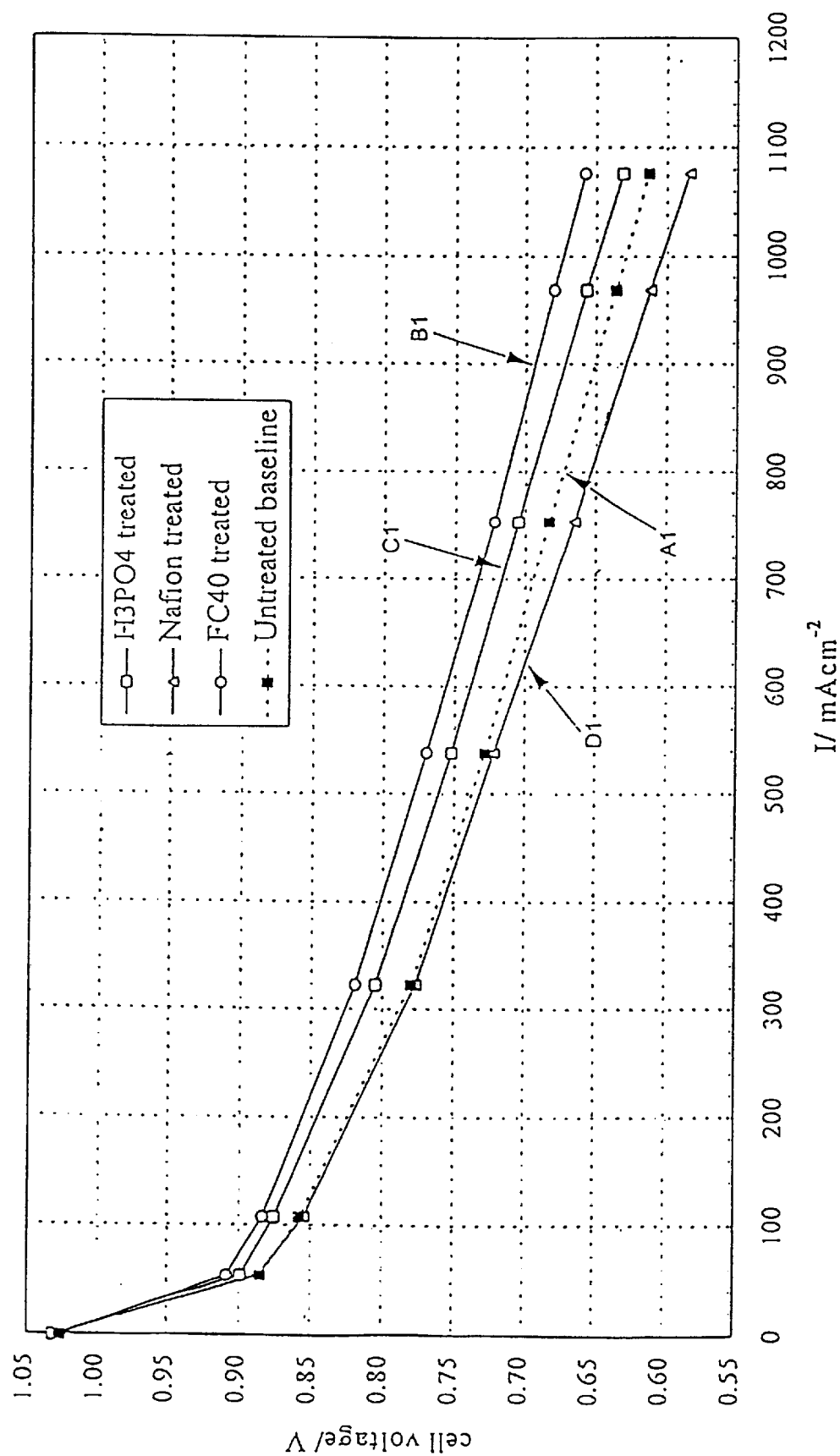
FIG. 1 is a graph showing plots of cell voltage versus current density (polarization curves) for one prior art electrochemical fuel cell and three fuel cells incorporating impregnated electrocatalyst particles, each using a different impregnant. All four electrochemical fuel cells have the same loading of 20% platinum on carbon electrocatalyst.

The present invention provides a method for treating electrode components and incorporating the treated electrode components to improve tolerance of electrochemical fuel cell electrodes to freeze-thaw cycles. The treatment method comprises impregnating micropores of electrode components with a fluid which remains in the micropores as an impregnant. Liquid impregnants preferably have a pour point or freezing lower than the freezing temperature of water, and preferable less than −25° C. and more preferably less than −40° C. The impregnant may remain in the liquid phase or alternatively, if the impregnant solidifies, when it solidifies, it does not expand in volume.

The impregnant may be selected to provide a plurality of beneficial properties. Many perfluoro compounds, for example, perfluorotributylamine, are suitable as impregnants, and in addition to having pour points lower than −50° C., some perfluoro compounds, such as perfluorotributylamine also are much more oxygen permeable compared to water. Thus using a perfluoro compounds as the impregnant for a porous electrocatalyst material used in the cathode may reduce the potential for freeze-thaw damage while also improving the oxygen transport properties within pores. It is generally desirable to improve the transport properties for bringing reactants such as oxygen into contact with the active cathode electrocatalyst.

Alternatively, the impregnant may comprise a mixture of different materials which together yield a plurality of desired properties. In this embodiment, one of the materials may have the effect of lowering the freezing temperature or pour point of the impregnant as a whole.

The impregnant is chosen from materials which are compatible with the internal environment of an electrochemical fuel cell. A compatible impregnant is defined as a material which will not react undesirably with process fluids or the electrochemical fuel cell components during the operational lifetime of the electrochemical fuel cell.

A preferred method of facilitating penetration of the impregnant into the micropores of the porous electrode components is to subject the components to a vacuum and/or elevated pressures above atmospheric pressure. The impregnant may be selected with consideration to its physical and chemical molecular structure for facilitating the impregnation of the micropores with the impregnant.

The electrode may comprise electrocatalyst particles and, optionally, other electrode components such as electrically conductive particles or fillers, mixed with an ionomer solution to form an ink which is applied to an electrode substrate. In a preferred method, an impregnant is impregnated into the micropores of the electrode components before the electrode is assembled. The advantage of impregnating the individual components is that during the impregnation step, none of the micropores are obscured by the ionomer or overlapping areas between the electrode components. The impregnation method may still be applied to assembled electrodes or in-situ in an assembled fuel cell, but it may be more difficult to impregnate pores within the electrode components once the electrode has been assembled. However, it may be desirable to first impregnate the micropores within the electrode components, and then impregnate the assembled electrode to impregnate micropores which form between the electrode components.

Tests were performed on two different types of carbon supported electrocatalyst particles: (1) 20% Pt/Shawinigan; and (2) 40% Pt/XC72R. These electrocatalyst particles are known to those skilled in the art as employing two different types of furnace black carbon particles as the electrocatalyst support.

The 20% Pt/Shawinigan electrocatalyst particles were not subjected to any pretreatment preparations, however, the 40% Pt/XC72R electrocatalyst particles were ground before being impregnated.

Both types of electrocatalyst particles were vacuum impregnated with three different impregnants, namely: (1) neat perfluorotributylamine; (2) a 5 molar solution of $H_3PO_4$; and (3) 5 per cent by weight perfluorosulfonic acid, EW 1100, ("Nafion") in alcohol. Perfluorotributylamine has a pour point of −57° C. 5 M $H_3PO_4$ has a freezing temperature of about −24° C. Nafion is amorphous and water contained within solid state Nafion may be kept from freezing at temperatures as low as −50° C. For the three liquid impregnants, their density increases as their temperature decreases (i.e. in the liquid phase they do not expand when subjected to temperatures below the freezing temperature or water).

The impregnated electrocatalyst particles were prepared by mixing 5 grams of the electrocatalyst particles with about 50 ml of the particular impregnant. The mixture was agitated in an ultrasound bath and then subjected to a vacuum until the mixture bubbled vigorously. After the vacuum treatment, the mixture was decanted and the impregnated electrocatalyst particles were separated using a filter.

When perfluorotributylamine was used as the impregnant, additional perfluorotributylamine was added to the mixture to reduce the viscosity. The mixture was placed under vacuum for a total of 3 hours. The filtered impregnated electrocatalyst particles were not washed.

When $H_3PO_4$ was used as the impregnant, the electrocatalyst and $H_3PO_4$ mixture was left under vacuum for a total of 3 hours. The impregnated electrocatalyst particles were washed with water after being separated from the excess liquid impregnant.

When Nafion was used as the impregnant, water was added to the electrocatalyst and Nafion mixture to reduce the viscosity. The mixture was kept under vacuum for 1.75 hours after which time the mixture stopped degassing. The impregnated electrocatalyst particles were washed with water after being separated from the excess liquid impregnant.

All vacuum impregnated electrocatalyst particles were dried in an oven prior to being mixed with a water and 5 weight per cent Nafion in alcohol to make a Nafion-catalyst ink. The Nafion-catalyst ink was spread onto a major surface of each of an anode and cathode carbon fiber paper substrate to provide a cathode catalyst loading of 0.68 mg Pt/cm$^2$ and an anode catalyst loading of about 0.3 mg Pt/cm$^2$. A solid polymer electrolyte membrane was positioned between the coated electrode surfaces and the membrane electrode assembly was bonded together using heat and pressure. For each of the two electrocatalyst types a fourth membrane electrode assembly was prepared using unimpregnated electrocatalyst particles, but the same Nafion and platinum loading.

The prepared membrane electrode assemblies were incorporated into electrochemical fuel cells and the performance of the vacuum impregnated electrocatalyst particles was measured under the following operating conditions:

Fuel: hydrogen
Fuel pressure: 30 psig
Fuel stoichiometry: 1.5
Oxidant: oxygen
Oxidant pressure: 30 psig
Oxidant stoichiometry: 10
Fuel cell temperature: 80° C.

Figure 2:
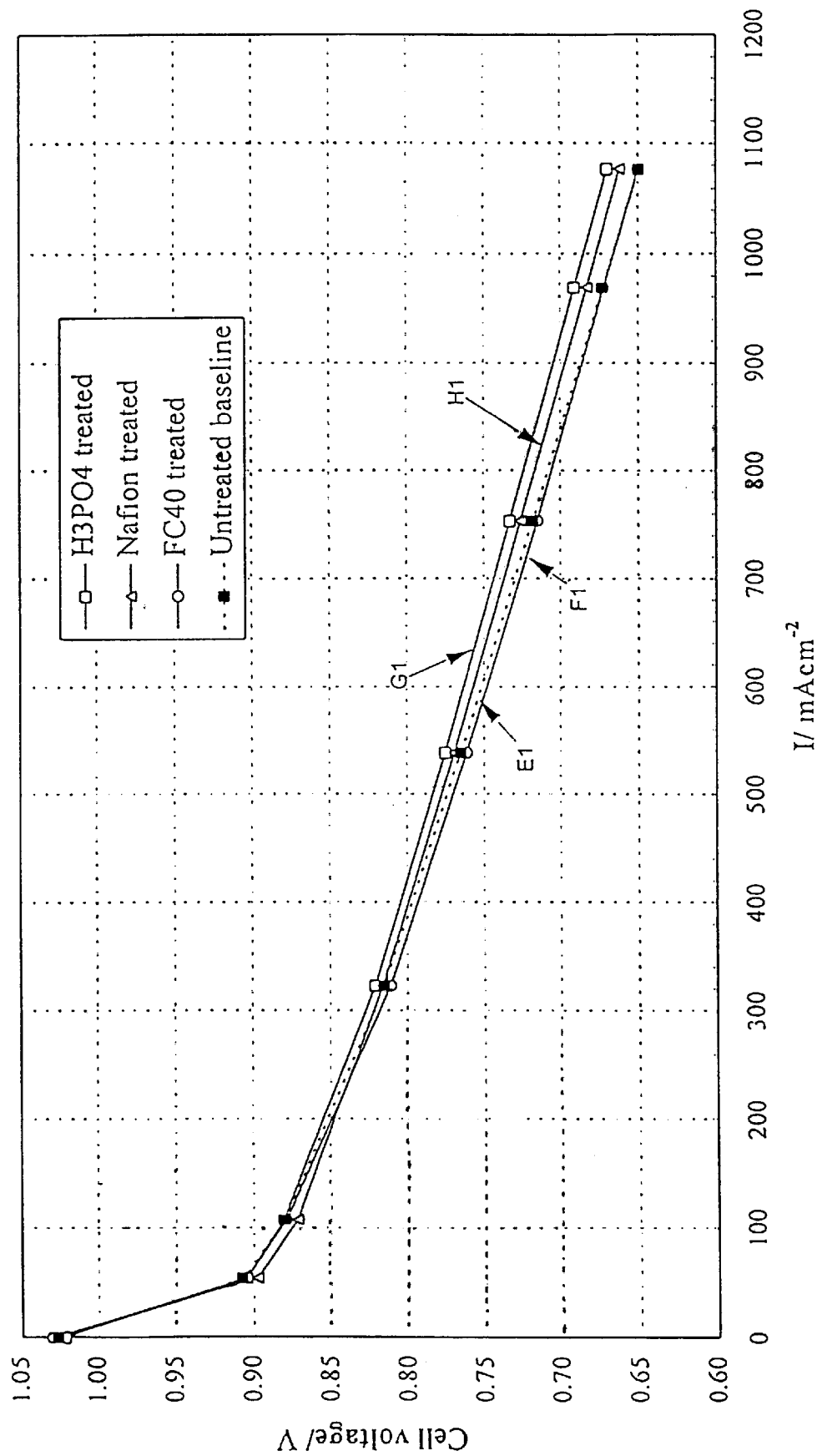
FIG. 2 is a graph showing polarization curves for one prior art electrochemical fuel cell and three fuel cells incorporating impregnated electrocatalyst particles, each using a different impregnant. All four electrochemical fuel cells have the same loading of 40% platinum on carbon electrocatalyst.

Steady state polarization tests yielded the data for the polarization curves (FIGS. 1 and 2). The results of the tests are discussed below.

EXAMPLE 1

FIG. 1 was produced from data measured from four electrochemical fuel cells which used 20% Pt/Shawinigan electrocatalyst particles. The four electrochemical fuel cells were all made in substantially the same way except for the treatment of the electrocatalyst particles. Three of the electrochemical fuel cells used electrocatalyst particles which were vacuum impregnated with an impregnant. A different impregnant was used for each one of the three electrochemical fuel cells, namely perfluorotributylamine, $H_3PO_4$, and Nafion. The fourth electrochemical fuel cell used electrocatalyst particles which were not vacuum impregnated, but which were deposited on the electrode substrate in a Nafion ink.

FIG. 1 is a plot of cell voltage versus current density for the four electrochemical fuel cells. Plot A1 is a plot of the performance measured for an electrochemical fuel cell using electrocatalyst particles which were not vacuum impregnated. Plot A1 represents the performance achieved by a prior art electrochemical fuel cell using untreated 20%/Shawinigan electrocatalyst particles deposited in a Nafion ink solution. FIG. 1 shows that an improvement in electrochemical fuel cell performance can be attained by using vacuum impregnated electrocatalysts. In accordance with a preferred method of the present invention, the electrocatalyst particles were pre-treated prior to deposition on to an electrode support. The most improved performance was observed for the electrochemical fuel cell which used electrocatalyst particles vacuum impregnated with perfluorotributylamine (Plot B1). The next best performance was measured for the electrochemical fuel cell which used electrocatalyst particles vacuum impregnated with $H_3PO_4$ (Plot C1). For the fuel cell which used electrocatalyst particles vacuum impregnated with Nafion, (Plot D1), for current densities higher than 400 mA/cm$^2$ there was a decrease in the performance levels, compared to the electrochemical fuel cell which used the untreated electrocatalyst (Plot A1).

EXAMPLE 2

FIG. 2 was produced from data measured from four electrochemical fuel cells which used 40% Pt/XC72R electrocatalyst particles. The four electrochemical fuel cells were all made in substantially the same way except for the treatment of the electrocatalyst particles. Three of the electrochemical fuel cells used electrocatalyst particles which were vacuum impregnated with an impregnant. As in Example 1, a different impregnant was used for each one of the three electrochemical fuel cells, namely $H_3PO_4$, Nafion, and perfluorotributylamine. The fourth electrochemical fuel cell used electrocatalyst particles which were not vacuum impregnated, but which were deposited on the electrode substrate in a Nafion ink.

FIG. 2 is a plot of cell voltage versus current density for the four electrochemical fuel cells which used 40% Pt/XC72R electrocatalyst particles. Plot E1 represents the performance achieved by a prior art electrochemical fuel cell using untreated 40% Pt/XC72R electrocatalyst particles deposited in a Nafion ink solution. Plot F1 is a plot of the performance measured for an electrochemical fuel cell using electrocatalyst particles which were vacuum impregnated with perfluorotributylamine. Plot G1 is a plot of the performance measured for an electrochemical fuel cell using electrocatalyst particles which were vacuum impregnated with $H_3PO_4$. Plot H1 is a plot of the performance measured for an electrochemical fuel cell using electrocatalyst particles which were vacuum impregnated with Nafion. The polarization curves in FIG. 2 show that the effect of the vacuum impregnation treatment of the 40% Pt/XC72R electrocatalyst particles produced a smaller improvement in fuel cell performance compared to the treated 20% Pt/Shawinigan electrocatalyst particles. The performance of the electrochemical fuel cell which used electrocatalyst particles impregnated with perfluorotributylamine was essentially the same as the electrochemical fuel cell which used untreated electrocatalyst particles. The electrochemical fuel cells which used $H_3PO_4$ and Nafion as the impregnants performed only slightly better than the electrochemical fuel cell which used untreated electrocatalyst. The electrochemical fuel cell using $H_3PO_4$ as the impregnant yielded the best results.

Examples 1 and 2 show that an impregnant with a pour point or freezing temperature much less than the freezing temperature of water can be impregnated into the micropores of an electrode component. The data shows that the performance of fuel cells which incorporate electrodes impregnated with such impregnates is enhanced, or at least not significantly diminished. Further, because the impregnants have pour points or freezing points less than the freezing temperature of water, there is less potential for freeze-thaw damage if the fuel cells are exposed to freeze-thaw cycles.

While the present invention has been described in the context of electrochemical fuel cells, the method and the treated electrode components may be used in other electrochemical processes such as electrolysis, electrolyzers in which water is present or produced, and where the electrodes may be exposed to freeze-thaw temperature cycles.

The method may also be applied to other electrochemical cell components which may also be porous, such as bipolar plates and gasket materials.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of reducing fuel cell performance degradation of an electrode comprising porous components, said electrode having present therein a liquid that expands upon freezing, said method comprising disposing an impregnant within at least some pores and micropores of said electrode components, whereby the presence of said impregnant in said pores and micropores reduces structural damage caused by freeze expansion of said liquid within said pores and micropores.

2. The method of claim 1 wherein said micropores comprise primary micropores.

3. The method of claim 2 wherein said micropores comprise pores with apertures less than 0.1 micron.

4. The method of claim 2 wherein said micropores comprise pores with apertures less than 0.04 micron.

5. The method of claim 1 wherein said impregnant is a liquid with a pour point or freezing point lower than the freezing temperature of water.

6. The method of claim 1 wherein said impregnant is a liquid with a pour point or freezing point less than or equal to −25° C.

7. The method of claim 1 wherein said impregnant is a liquid with a pour point or freezing point less than or equal to −40° C.

8. The method of claim 1 wherein said impregnant does not increase in volume when changing phases from a liquid to a solid.

9. The method of claim 1 wherein said impregnant is a mixture of materials.

10. The method of claim 1 wherein said impregnant is a liquid which is immiscible with water.

11. The method of claim 1 wherein said impregnant comprises a hydrophobic material.

12. The method of claim 1 wherein said impregnant is deposited within said pores in liquid form and remains in the pores in solid form.

13. The method of claim 12 wherein said impregnant is a resin which is curable to solidify within said pores.

14. The method of claim 1 wherein said impregnant is a dispersion comprising particles suspended in a liquid.

15. The method of claim 14 wherein said particles are polytetrafluoroethylene.

16. The method of claim 1 wherein said impregnant comprises an inorganic acid.

17. The method of claim 16 wherein said inorganic acid is selected from the group consisting of $H_3PO_4$ and $HNO_3$.

18. The method of claim 1 wherein said impregnant comprises an organic acid.

19. The method of claim 18 wherein said organic acid is a fluorinated organic acid.

20. The method of claim 19 wherein said fluorinated organic acid is selected from the group consisting of $CF_3COOH$ and $CF_3SO_3H$.

21. The method of claim 1 wherein said impregnant comprises a polymer.

22. The method of claim 1 wherein said impregnant comprises an organic fluid.

23. The method of claim 22 wherein said organic fluid is selected from the group consisting of hydrocarbons and fluorocarbons.

24. The method of claim 22 wherein said organic fluid is 1-decene.

25. The method of claim 22 wherein said organic fluid is a perfluorocarbon.

26. The method of claim 25 wherein said perfluorocarbon is selected from the group consisting of perfluorotripropylamine, cis-perfluorodecalin, trans-perfluorodecalin, perfluoro-1-methyl decalin, perfluoroisopentyltetrahydropyrane, perfluoro-N,N-dimethylcyclohexylamine, perfluoroperhydrophenanthrene, perfluorotripentylamine, and perfluorotributylamine.

27. The method of claim 22 wherein said organic fluid is a silicone oil or a mineral oil.

28. The method of claim 1 wherein said fuel cell comprises an electrolyte which is a proton exchange membrane.

29. The method of claim 1 wherein said porous electrode components comprise carbon-supported electrocatalyst particles.

30. The method of claim 1 wherein said porous electrode components comprise an electrically conductive particulate filler material.

31. The method of claim 1 wherein said porous electrode components comprise a carbon black.

32. The method of claim 1 wherein said porous electrode components comprise an electrically conductive sheet material substrate.

33. The method of claim 1 wherein said liquid is water.

34. The method of claim 1 wherein said impregnant inhibits expansion of said liquid within said pores by reducing accumulation of said liquid within said pores.

35. The method of claim 1 wherein said impregnant inhibits expansion of said liquid within said pores by lowering the freezing temperature of said liquid.

36. A method of impregnating a porous electrode component for reducing fuel cell performance degradation resulting from liquid freeze-expansion within pores of said component, said method comprising contacting said electrode component with an impregnant at a pressure below atmospheric pressure, until said impregnant is deposited within micropores of said electrode component.

37. The method of claim 36 wherein said impregnant has a pour point or freezing point less than the freezing temperature of water.

38. The method of claim 36 further comprising sequentially contacting said electrode component with said impregnant at a pressure above atmospheric pressure.

39. The method of claim 36 wherein said porous electrode component is an electrocatalyst which is a carbon-supported electrocatalyst.

40. The method of claim 36 wherein said porous electrode component is carbon black.

41. A method of impregnating a porous electrode component for reducing fuel cell performance degradation resulting from liquid freeze-expansion within pores of said electrode, said method comprising contacting said electrode component with an impregnant at a pressure above atmospheric pressure, until said impregnant is deposited within micropores of said electrode component.

42. The method of claim 41 wherein said porous electrode component is an electrocatalyst which is a carbon-supported electrocatalyst.

43. The method of claim 41 wherein said porous electrode component is carbon black.

44. An electrochemical fuel cell with improved resistance to performance degradation of an electrode caused by liquid freeze-expansion within pores and micropores of porous components of said electrode, said fuel cell comprising:

(a) an anode comprising porous anode components;

(b) a cathode comprising porous cathode components;

(c) an electrolyte disposed between said anode and said cathode, wherein at least a portion of the pores and micropores of said anode and cathode porous components are impregnated with an impregnant which inhibits anode and cathode deterioration caused by liquid freeze-expansion.

45. The electrochemical fuel cell of claim 44 wherein said impregnant has a pour point or freezing temperature less than the freezing temperature of water.

46. The electrochemical fuel cell of claim 44 wherein said impregnant does not expand when changing phases from a liquid to a solid.

47. The electrochemical fuel cell of claim 44 wherein said porous anode and cathode components comprise electrocatalyst particles.

48. The electrochemical fuel cell of claim 44 wherein said electrolyte comprises a proton exchange membrane.

* * * * *